United States Patent

[11] 3,633,928

| [72] | Inventor | Douglas Smith<br>30 Highland Ave., Rowayton, Conn. 06853 |
|---|---|---|
| [21] | Appl. No. | 16,918 |
| [22] | Filed | Mar. 5, 1970 |
| [45] | Patented | Jan. 11, 1972 |

[54] PIPE JOINT COUPLING WITH GASKET SEAL
3 Claims, 6 Drawing Figs.

[52] U.S. Cl. ............................................ 277/206 R
[51] Int. Cl. ............................................ F16j 15/08
[50] Field of Search ............................ 277/205, 206 R

[56] References Cited
UNITED STATES PATENTS

| 3,204,971 | 9/1965 | Meriano | 277/206 X |
| 1,926,107 | 9/1933 | Morehead | 277/206 X |
| 2,041,132 | 5/1936 | Johnson | 277/206 X |

*Primary Examiner*—Robert I. Smith
*Attorney*—Hubert A. Howson

ABSTRACT: An apparatus for holding two pipe ends together which are subject to repeated stresses tending to pull them apart in an axial direction comprising a sealing element seated in generally rectangular, open-ended slots provided in each pipe end, and slots facing each other, said element being formed of resilient metal in the configuration of a circumferentially corrugated cylindrical ring, the ends of the ring being folded back upon the body of the ring inwardly toward the axis of the coupling and seated in said facing annular slots.

PATENTED JAN 11 1972
3,633,928
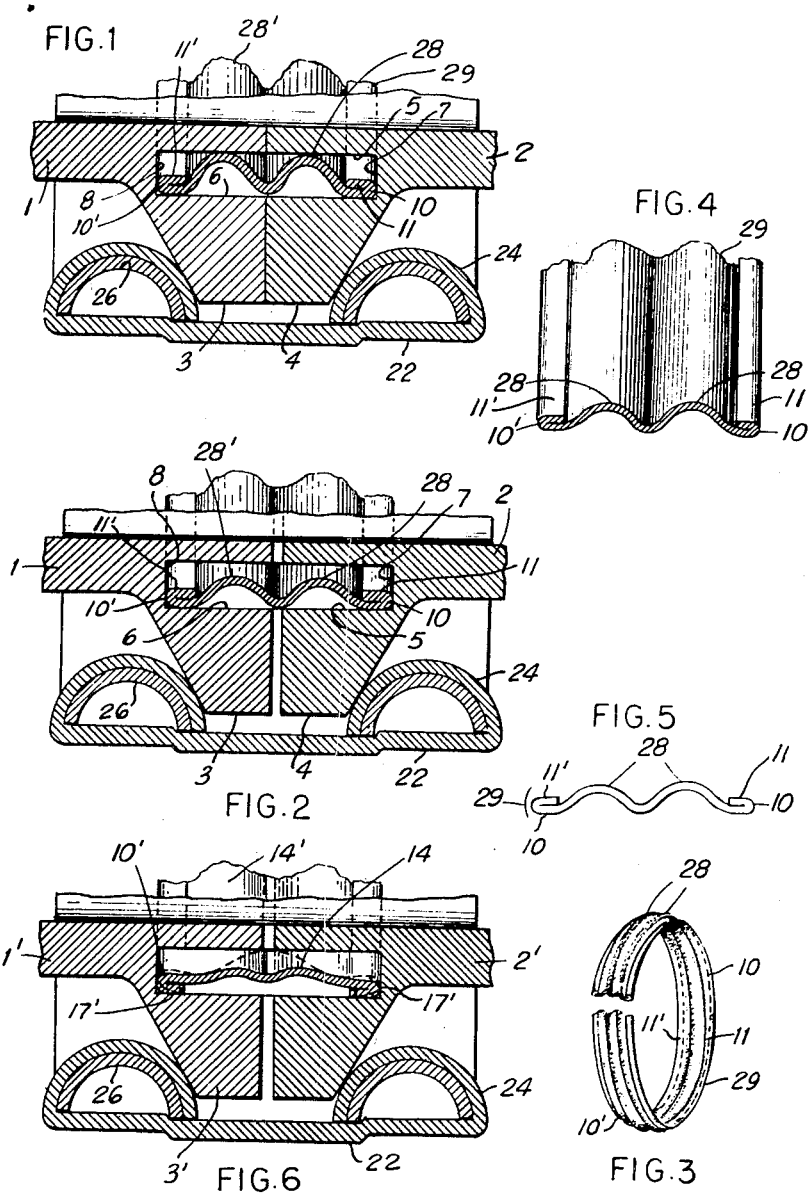
INVENTOR:-
Douglas Smith.
By:- Hubert A. Howson,
ATTORNEY.

PIPE JOINT COUPLING WITH GASKET SEAL

This invention pertains to pipe joint couplings with gasket seals, and more particularly to apparatus affording a fluidtight sealing together of joints of mechanically coupled pipe lengths that are subjected to sudden and severe shocks from substances being conveyed through the pipe lengths. This application is an improvement on my U.S. Pat. No. 3,240,501, dated Mar. 15, 1966.

In this prior patent in order to obtain a tight seal the ends of a sealing element are tapered as shown, for example, in figure No. 1 of the drawings. I have now found that it is possible to obtain a tight joint without employing any tapered construction thereby producing a simple and less expensive construction. This new invention has additional advantages not found in my previous patent as explained in more detail hereinafter.

The construction of my previous patent was based on a corrugated ring and my present invention can also employ a circumferentially corrugated ring but of different characteristics. In FIGS. 1, 2 and 3 of the drawings of my prior U.S. patent the two pipe ends which are being joined are designated by reference characters 1 and 2. It will be observed that the active sealing elements in holding these parts together is of a wavy construction. These are designated in general by the reference character 29. In FIG. 1 of my prior patent the two pipe ends 1 and 2 to be joined are shown separated slightly as would occur under shock whereas in FIG. 2 the ends are not under shock and are in direct contact with each other. It will be seen that while the separation under shock reduced the height of the waves 29 slightly, the tightness of the joint in my prior patent was obtained by the taper at the ends of the element 29. According to my present invention it is not necessary to provide any tapering insert of the ends of the element 29 and a tighter and better joint is obtained in a simpler way. I will now refer briefly to the new factors which I employ in place of the taper. One factor used in place of a taper is a difference in the amount of "springback." In other words, the metal used has a certain amount of resiliency which I will term spring back. In the drawings I have identified the O-ring generally by the reference character 29, and it will be observed that there are two waves of bends or corrugations 28 in the O-ring. The effective height of the described O-ring amounts to 0.0015 of an inch.

According to my new invention, without using any tapering construction such as those shown in my previous patent, I am able to obtain greater springback. This is done by making the effective height of the wavy element much less than heretofore. I have found an altered construction, by which the effective height of the wavy element may be reduced to 0.0006 of an inch instead of 0.0015 of an inch. Thus, by my new construction the resistance of the ring to axial compression comes, very much closer to the resistance which would be obtainable if the wavy element were a straight line. This springback enables sealing of the element against, a flat surface in place of the tapered surface of my prior patent. Thus I now attain resistance to shock with less flexing of said element. This is one of the important advantages of my present invention in that the element has, truly elastic capacity.

Further, I do not need to use a seal element stiffener as was the case in my previous patent and this has the advantage of having less parts and fewer interstices through which the enclosed fluid might leak.

The improvement which defines the present invention as shown in the drawing, wherein:

FIG. 1 is a plan view in cross section of one side of two pipes mechanically coupled with the coupling of my present invention, the parts being shown together, i.e., not under shock.

FIG. 2 is a view similar to FIG. 1 showing the pipe ends separated under shock condition.

FIG. 3 is a perspective view of an O-ring such as used in FIGS. 1 and 2.

FIG. 4 is a partial view of one side of the O-ring used in FIGS. 1 and 2.

FIG. 5 is a further schematic, sectional view of the wavy element of FIGS. 1 to 4 by itself with the ends turned upwardly whereby the effective height of the corrugations may be reduced.

FIG. 6 is a view of the parts showing the ends separated under shock with a dotted curved line showing the effect produced where the marginal, annular edges or ends of the seal element are folded outwardly instead of inwardly. The result is a breakdown in the effectiveness of the seal as will be described.

As explained in my prior patent above referred to the object of the invention is to hold together the ends of two pipes which are subject to separation a short distance under the shocks of normal use such as produced by pulses in the fluid or gaseous stream being carried within the pipes. These shocks occur in a direction tending to separate the two pipe ends a short distance. The seal element thus changes dimensions to assimilate changes in the spacing between the pipe ends.

In my present invention the pipe ends are indicated by the reference characters 1 and 2, as in my prior patent, and the curvilinear element is indicated generally by the reference character 29. The individual corrugations are indicated by the reference characters 28. And comprise at least two circumferential, inward, bends 28 in each seal element 29.

It will be seen that the ends or annular, marginal edges 10 of the seal element are bent upwardly, i.e., doubled back on themselves on the inner or pipe side, as shown for instance in FIGS. 1 and 2 of the drawings. The height of the corrugations 28 are reduced, as stated, to a considerable degree from that showing in my prior patent so that the seal element more nearly approaches the configuration of a flat annular ring.

Turning to the drawings, it may be seen that the pipe ends 1 and 2 are provided with shoulders 3 and 4 respectively. Suitably formed in shoulders 3 and 4 are generally annular grooves or slots 5 and 6, respectively. These grooves are generally rectangular in section and include flat, annular sealing bottoms 7 and 8 against which the ends of sealing element 29 bear in sealing contact.

As previously stated, the seal element 29 is cylindrical in form and includes at least a pair of circumferential corrugations or waves 28. The spaced ends of seal elements 29 at 10, 10' respectively are provided with a folded back portion 11, 11' respectively, and, as clearly shown in FIGS. 1, 2 and 4 these folded back portions are inwardly folded, that is folded back against the main portion of the seal in the direction of the center of the element 29. This is vital to the proper operation of the seal element 29 and the reasons therefore will be apparent from a comparison of FIG. 2 showing the sealing element of the invention compared with a seal element having the end edges folded outward.

When the pipe ends separate due to the shock load the inherent resiliency of the material causes corrugations 28 to tend to straighten to more cylindrical form. If the extreme edges of the element are folded inwardly, according to my invention, the edges tend to "roll out" that is, unfold outwardly thus maintaining the edges in firm contact with the bottom walls 7 and 8 of the grooves 5 and 6.

On the other hand, if the edges of the sealing element are folded outwardly as shown in FIG. 6, as the pipe ends 1', 2' pull apart and corrugations 14, 14' tend to flatten the ends of the seal element 29' at 17, 17' tend to roll inwardly so that contact against the bottom walls 7', 8' of grooves 5', 6' is reduced. Hence, fluid or gas can work its way around the edges of the seal and leakage occurs.

In FIGS. 1, 2 and 6 the pipe ends are locked together by identical clamp means 22 having reinforced annular ribs 24, 26 abutting against the walls of the pipe and shoulders 32 and 34.

Having thus described my invention in detail what I claim is:

1. In combination with the ends of a pair of axially aligned pipe sections having grooves of generally rectangular open ended form in abutting face-to-face relation, a generally cylindrical sealing element, said sealing element having its opposite annular ends disposed in said grooves; at least a pair of circumferential corrugations formed in said cylindrical sealing element; the spaced ends of said element being folded back inwardly toward said pipe ends and tightly against the body of said seal element whereby axial displacement of said pipe ends causes axial expansion of said seal element while said ends bear against the bottoms of said grooves in sealing contact irrespective of the axial displacement of said pipe ends.

2. The combination as defined in claim 1 wherein a clamp surrounds and maintains the pipe ends in aligned relation.

3. The combination defined in claim 1 wherein said corrugations are disposed inwardly toward the axis of said coupling.

* * * * *